(12) United States Patent
Uchiyama et al.

(10) Patent No.: US 11,541,956 B2
(45) Date of Patent: Jan. 3, 2023

(54) STRADDLE-TYPE VEHICLE

(71) Applicant: SUZUKI MOTOR CORPORATION, Hamamatsu (JP)

(72) Inventors: Takahiro Uchiyama, Hamamatsu (JP); Akihito Deguchi, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 14 days.

(21) Appl. No.: 17/359,071

(22) Filed: Jun. 25, 2021

(65) Prior Publication Data
US 2021/0403114 A1    Dec. 30, 2021

(30) Foreign Application Priority Data

Jun. 25, 2020 (JP) .............................. JP2020-109534

(51) Int. Cl.
| | | |
|---|---|---|
| *B62J 40/10* | (2020.01) | |
| *B62J 41/00* | (2020.01) | |
| *B62K 11/04* | (2006.01) | |
| *B62M 7/02* | (2006.01) | |

(52) U.S. Cl.
CPC ............... *B62J 40/10* (2020.02); *B62J 41/00* (2020.02); *B62K 11/04* (2013.01); *B62M 7/02* (2013.01)

(58) Field of Classification Search
CPC ........................................................ B62J 40/10
USPC ........................................................ 180/229
See application file for complete search history.

(56) References Cited

U.S. PATENT DOCUMENTS

| | | | | |
|---|---|---|---|---|
| 4,476,951 A | * | 10/1984 | Ito ........................... | F02B 75/20 |
| | | | | 123/195 A |
| 4,830,135 A | * | 5/1989 | Yamashita ............. | B60K 11/08 |
| | | | | 180/68.1 |
| 6,105,701 A | * | 8/2000 | Buell ....................... | B62J 17/10 |
| | | | | 180/229 |
| 7,527,115 B2 | * | 5/2009 | Tsuya ............... | F02M 35/10013 |
| | | | | 123/41.6 |
| 2016/0318570 A1 | | 11/2016 | Konno | |

FOREIGN PATENT DOCUMENTS

| | | | | |
|---|---|---|---|---|
| JP | 2004100632 A | * | 4/2004 | ............... F02B 61/02 |
| JP | 2005069231 A | * | 3/2005 | ............... B62J 35/00 |
| JP | 6492940 B2 | | 4/2019 | |

* cited by examiner

*Primary Examiner* — Jacob D Knutson
*Assistant Examiner* — Hosam Shabara
(74) *Attorney, Agent, or Firm* — Troutman Pepper Hamilton Sanders LLP

(57) ABSTRACT

A straddle-type vehicle includes a fuel pipe provided on a rear side of an engine, a generator provided on the rear side of the engine and adjacent to the fuel pipe, an outside air introduction duct configured to guide air outside the straddle-type vehicle to the rear side of the engine, and a partition wall provided between the fuel pipe and the generator. The partition wall partitions a region on the rear side of the engine into a generator arrangement region where the generator is provided and a fuel pipe arrangement region where the fuel pipe is provided. The outside air introduction duct includes a first outlet configured to allow the air to flow out to the generator arrangement region.

6 Claims, 10 Drawing Sheets

STRADDLE-TYPE VEHICLE

CROSS-REFERENCE TO RELATED APPLICATION

The disclosure of Japanese Patent Application No. 2020-109534 filed on Jun. 25, 2020, including specification, drawings and claims is incorporated herein by reference in its entirety.

BACKGROUND

The present invention relates to a straddle-type vehicle including a duct that cools a component by introducing outside air.

In a straddle-type vehicle, on a rear side of an engine, traveling wind is blocked by the engine itself, a vehicle body frame, a cowl or the like. Therefore, it is difficult for the traveling wind to blow the rear side of the engine. Therefore, a temperature of a region on the rear side of the engine tends to rise during traveling. In addition, a generator may be disposed on the rear side of the engine. The generator is driven during operation of the engine, and generates heat when being driven. Therefore, when the generator is disposed on the rear side of the engine, the temperature of the region on the rear side of the engine tends to further rise during traveling.

In the straddle-type vehicle, a fuel pipe is provided on the rear side of the engine, more specifically, on a rear side of a cylinder head. Therefore, when the temperature of the region on the rear side of the engine rises, a temperature of fuel rises. When the temperature of the fuel rises, a density of the fuel may decrease and an output of the engine may decrease.

The following Japanese Patent No. 6492940 discloses a straddle-type vehicle that includes a duct for introducing outside air to a rear side of an engine, and supplies the outside air introduced by the duct to a generator provided on the rear side of the engine and a vicinity thereof.

SUMMARY

According to one advantageous aspect of the invention, there is provided a straddle-type vehicle including:
a vehicle body frame;
a front wheel supported by a front portion of the vehicle body frame via a front fork;
a rear wheel supported by a rear portion of the vehicle body frame via a swing arm;
an engine located between the front wheel and the rear wheel and supported by the vehicle body frame;
a fuel pipe provided on a rear side of the engine and configured to supply fuel to the engine;
a generator provided on the rear side of the engine, adjacent to the fuel pipe, and configured to generate electric power using power of the engine;
an outside air introduction duct configured to guide air outside the straddle-type vehicle to the rear side of the engine; and
a partition wall, provided between the fuel pipe and the generator, and partitioning a region on the rear side of the engine into a generator arrangement region where the generator is provided and a fuel pipe arrangement region where the fuel pipe is provided, wherein
the outside air introduction duct includes a first outlet configured to allow the air to flow out to the generator arrangement region.

DETAILED DESCRIPTION

Figure 1:
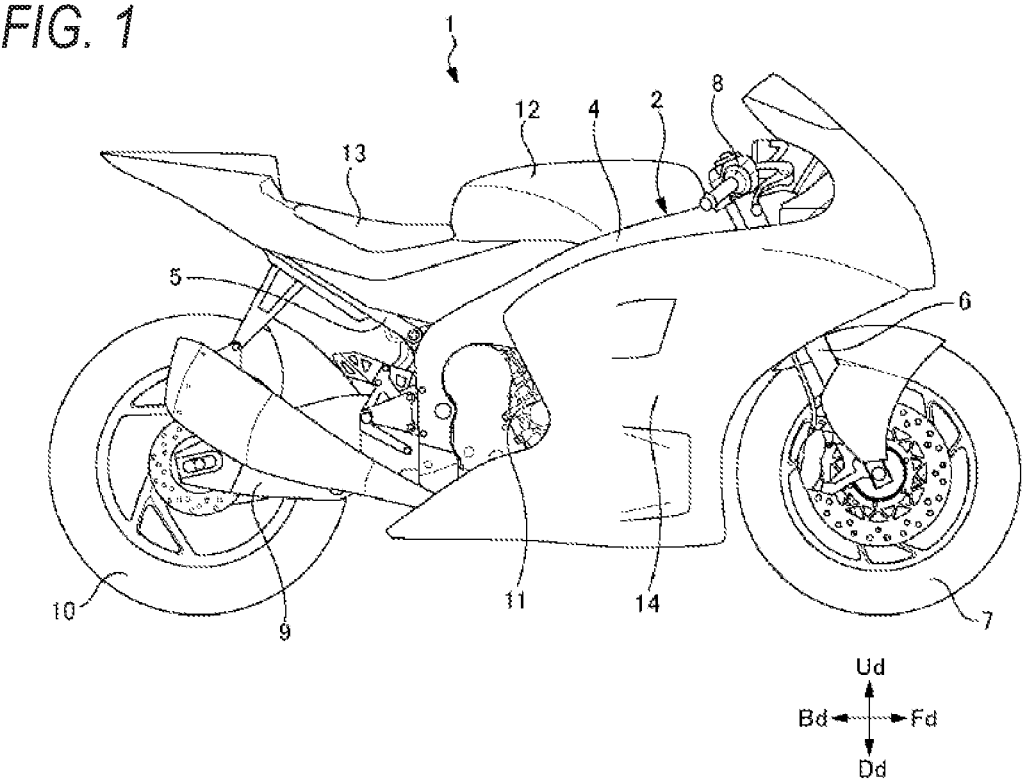
FIG. 1 is an external view showing a straddle-type vehicle according to an embodiment of the present invention.

In the straddle-type vehicle in which the generator is disposed on the rear side of the engine and the duct for introducing the outside air to the rear side of the engine is provided, a temperature rise in a region on the rear side of the engine during traveling is verified. As a result, it has been found that a major factor in the temperature rise in the region on the rear side of the engine is heat generated by the generator and that it is difficult to sufficiently prevent a rise in a fuel temperature by simply supplying the outside air introduced by the duct to the generator and the vicinity thereof.

The present invention has been made in view of the above-described problems, and an object thereof is to provide a straddle-type vehicle capable of preventing a rise in a fuel temperature in a case where a fuel pipe and a generator are provided on a rear side of an engine.

A straddle-type vehicle includes: a vehicle body frame; a front wheel supported by a front portion of the vehicle body frame via a front fork; a rear wheel supported by a rear portion of the vehicle body frame via a swing arm; an engine located between the front wheel and the rear wheel and supported by the vehicle body frame; a fuel pipe provided on a rear side of the engine and configured to supply fuel to the engine; and a generator provided on the rear side of the engine, adjacent to the fuel pipe and configured to generate electric power using power of the engine. The straddle-type vehicle further includes: an outside air introduction duct configured to guide air outside the straddle-type vehicle to the rear side of the engine; and a partition wall provided between the fuel pipe and the generator and partitioning a region on the rear side of the engine into a generator arrangement region where the generator is provided and a fuel pipe arrangement region where the fuel pipe is provided. The outside air introduction duct includes a first outlet configured to allow the air to flow out to the generator arrangement region.

According to the straddle-type vehicle of the embodiment of the present invention, an amount of heat transmitted from the generator to the fuel pipe can be reduced by a heat insulation action of the partition wall provided between the fuel pipe and the generator. Accordingly, a temperature rise of fuel flowing through the fuel pipe can be prevented.

The air introduced by the outside air introduction duct is allowed to flow out of the first outlet to the generator arrangement region, so that the air can intensively blow against the generator. Accordingly, an effect of cooling the generator can be enhanced, and the amount of the heat transmitted from the generator to the fuel pipe can be further reduced.

Further, the region on the rear side of the engine is partitioned into the generator arrangement region and the fuel pipe arrangement region by the partition wall, so that the air after flowing through the generator arrangement region can be prevented from entering the fuel pipe arrangement region. Therefore, exhaust air with the heat generated by the generator can be prevented from blowing against the fuel pipe, and an effect of preventing a temperature rise of the fuel flowing through the fuel pipe can be enhanced.

Hereinafter, an embodiment of a straddle-type vehicle according to the present invention will be described with reference to the drawings. In the following description, when directions of upper (Ud), lower (Dd), front (Fd), rear (Bd), left (Ld) and right (Rd) are described, follow arrows drawn in a lower right side of each drawing.

Figure 2:
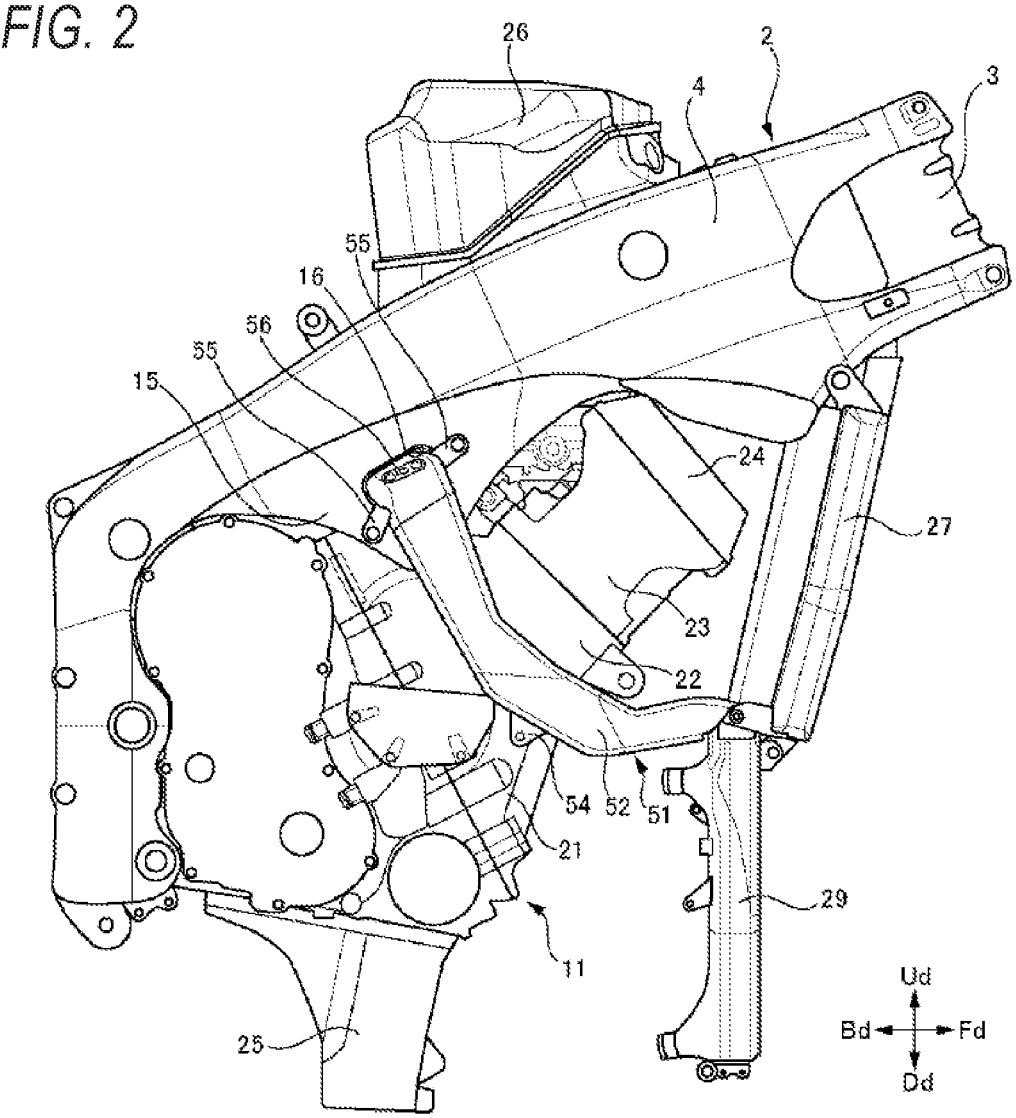
FIG. 2 is an explanatory view showing a state in which a part of a vehicle body frame, an engine, a radiator, an oil cooler, an air cleaner, an outside air introduction duct and the like in the straddle-type vehicle according to the embodiment of the present invention are viewed from a lateral side.
Figure 3A:
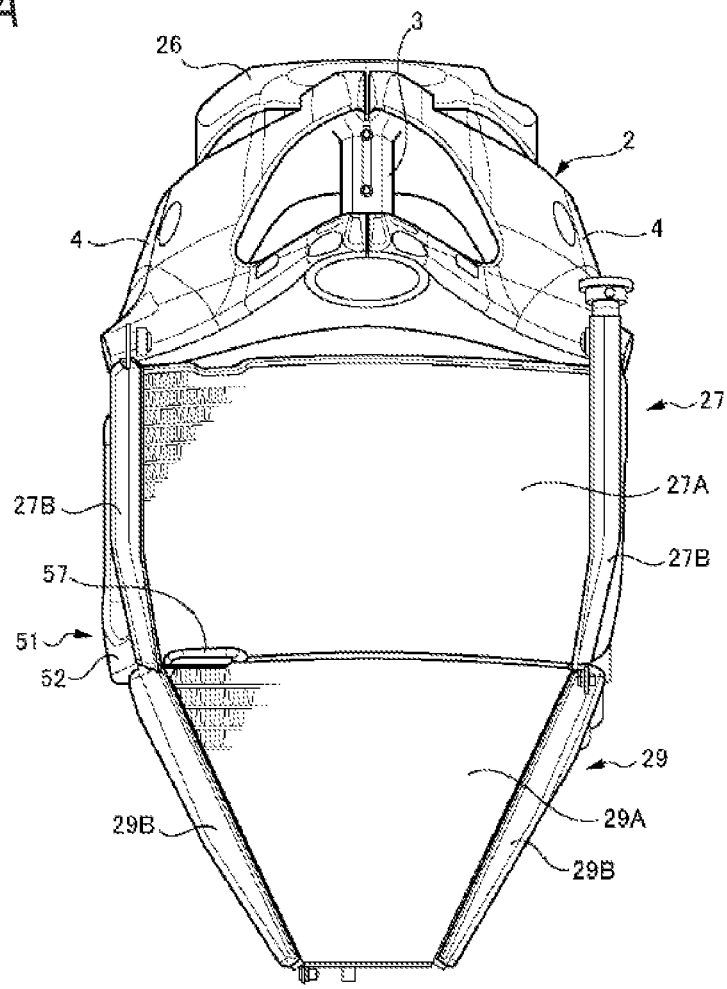
FIGS. 3A and 3B are explanatory views showing a state in which the vehicle body frame, the radiator, the oil cooler, the air cleaner, the outside air introduction duct and the like in the straddle-type vehicle according to the embodiment of the present invention are viewed from a front side.
Figure 3B:
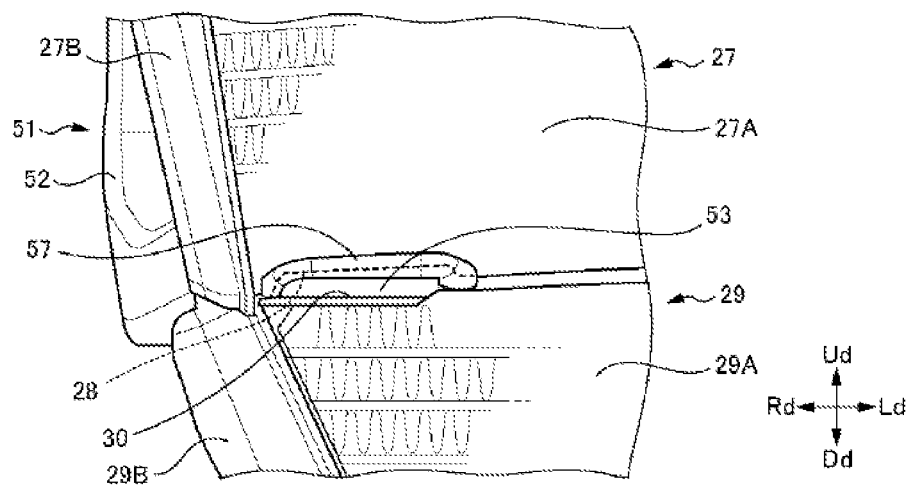

FIG. 1 shows a straddle-type vehicle 1 according to an embodiment of the present invention as viewed from a right side. FIG. 2 shows a part of a body frame 2, an engine 11, a radiator 27, an oil cooler 29, an air cleaner 26, an outside air introduction duct 51 and the like in the straddle-type vehicle 1 as viewed from the right side. FIG. 3A shows the vehicle body frame 2, the radiator 27, the oil cooler 29, the air cleaner 26, the outside air introduction duct 51 and the like as viewed from a front side. FIG. 3B is an enlarged view of a lower right portion of the radiator 27 and an upper right portion of the oil cooler 29 in FIG. 3A.

As shown in FIG. 1, the straddle-type vehicle 1 is, for example, a motorcycle. The straddle-type vehicle 1 includes the vehicle body frame 2 forming a skeleton thereof. The vehicle body frame 2 is, for example, a twin-spar frame, and includes, as shown in FIG. 2, a head pipe 3 disposed at an upper front portion of the straddle-type vehicle 1, and two main frames 4 extending rearward from the head pipe 3 while expanding to left and right sides. As shown in FIG. 1, a seat rail 5 is connected to a rear portion of each main frame 4.

A steering shaft is rotatably supported by the head pipe 3. An upper portion of a front fork 6 is supported by the steering shaft via a bracket, and a front wheel 7 is rotatably supported at a lower portion of the front fork 6. A handle 8 is fixed to the steering shaft via a bracket. On the other hand, a front portion of a swing arm 9 is rotatably supported at a lower portion of a rear portion of each of the two main frames 4, and a rear wheel 10 is rotatably supported at a rear portion of the swing arm 9. The engine 11 is provided between the front wheel 7 and the rear wheel 10. A tank cover 12 that covers the air cleaner 26, a fuel tank and the like is provided above the engine 11, and a seat 13 is provided behind the tank cover 12. A cowl 14 that widely covers an upper front portion, a left front portion, and a right front portion of the vehicle is provided in the straddle-type vehicle 1.

In FIG. 2, the engine 11 is, for example, a four-cycle parallel four-cylinder gasoline engine, which is supported by the two main frames 4. In the present embodiment, the engine 11 is greatly inclined forward. The engine 11 includes a crankcase that accommodates a crankshaft and an engine case 21 that also serves as a transmission case to accommodate a transmission. A cylinder block 22 is provided at an upper front side of the engine case 21, a cylinder head 23 is provided at a front upper side of the cylinder block 22, and a cylinder head cover 24 is provided at an upper front side of the cylinder head 23. An oil pan 25 is provided at a lower portion of the engine case 21. The air cleaner 26 that purifies air for fuel combustion is provided above the engine 11. A case of the air cleaner 26 is made of, for example, a resin material. The outside air introduction duct 51 is provided on a right side of the engine 11. The outside air introduction duct 51 will be described later.

The radiator 27 as an upper heat exchanger and the oil cooler 29 as a lower heat exchanger are provided in front of the engine 11 and behind the front wheel 7. The radiator 27 is the heat exchanger for cooling engine cooling water, and includes a core 27A and tanks 27B provided on both left and right sides of the core 27A. The oil cooler 29 is the heat exchanger for cooling engine oil that lubricates and cools inside the engine 11, and includes a core 29A and tanks 29B provided on both left and right sides of the core 29A. As shown in FIG. 3A, the radiator 27 and the oil cooler 29 are vertically arranged such that the radiator 27 is on the upper side and the oil cooler 29 is on the lower side. The radiator 27 and the oil cooler 29 are adjacent to each other.

Figure 4A:
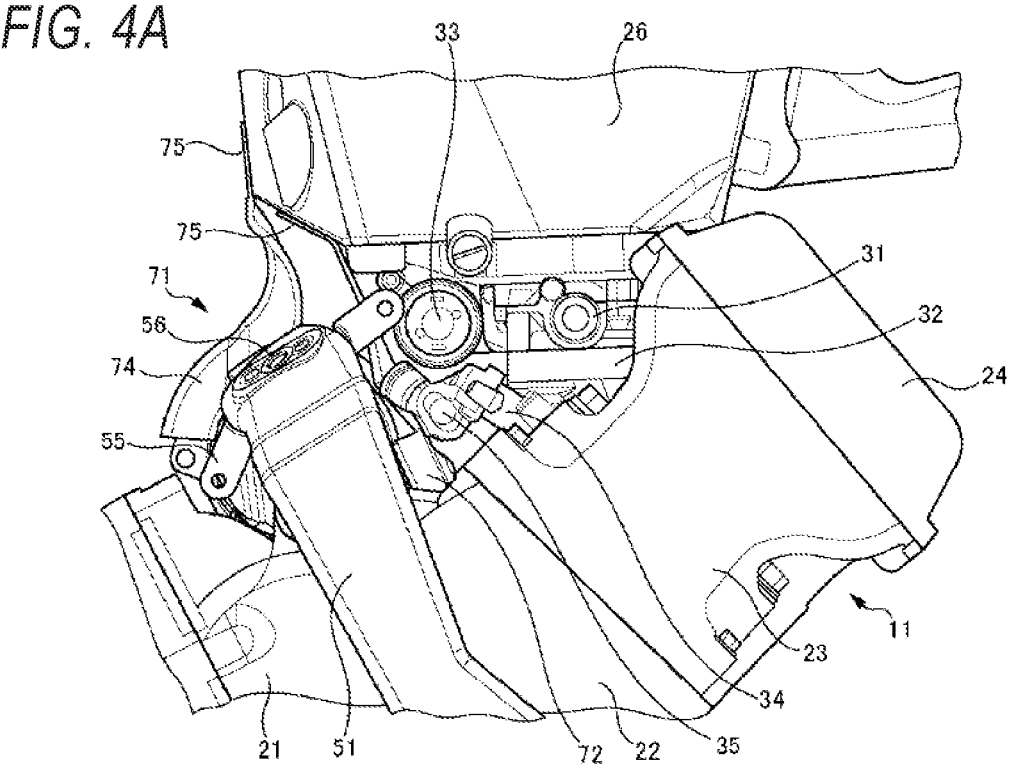
FIGS. 4A and 4B are explanatory views showing a state in which components disposed on a rear side of the engine are viewed from the lateral side in the straddle-type vehicle according to the embodiment of the present invention.
Figure 4B:
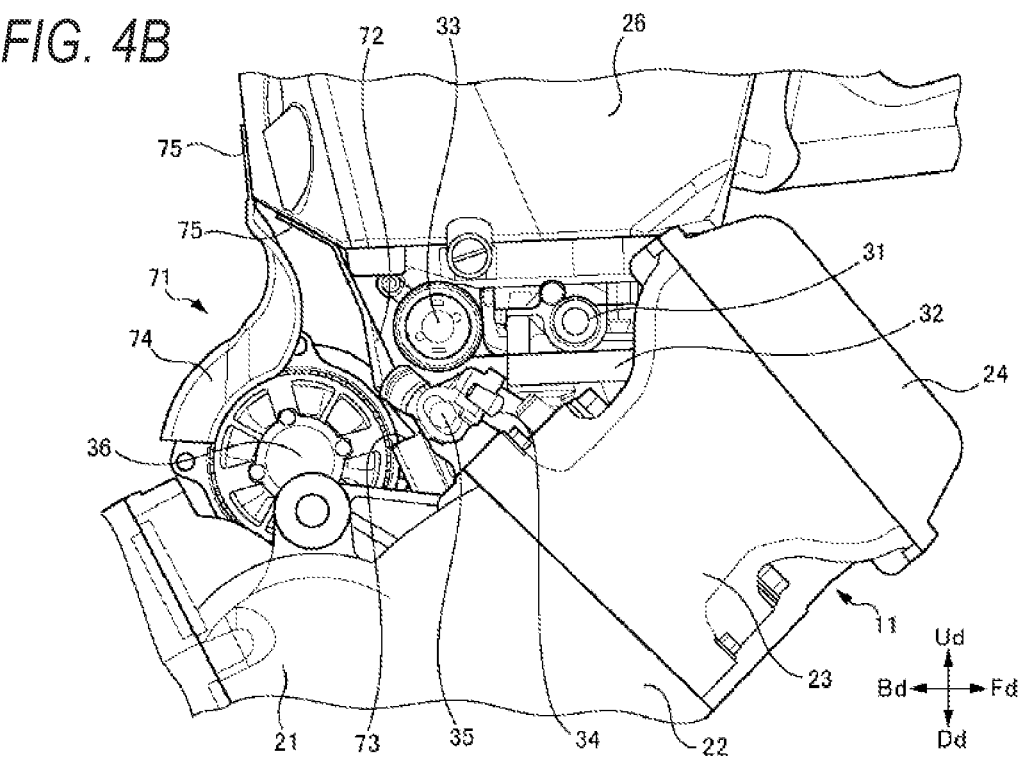

FIG. 4A shows components disposed on a rear side of the engine 11. FIG. 4B shows a state in which the outside air introduction duct 51 is removed from FIG. 4A. As shown in FIG. 4B, a throttle body 31, intake pipes 32 and a throttle valve drive motor 33 are provided on the rear side of the engine 11 as a downdraft type intake mechanism that allows the air for fuel combustion to flow into the cylinders of the engine 11. Injectors 34 and a fuel pipe 35 are provided on the rear side of the engine 11 as a fuel injection mechanism that injects fuel into the air for fuel combustion. A generator 36 and a partition wall 71 are provided on the rear side of the engine 11. Since a region on the rear side of the engine 11 provided with these components is sandwiched between the two thick main frames 4 and covered with the cowl 14, when traveling wind is not introduced into the region by the outside air introduction duct 51, the traveling wind is difficult to flow therein.

Figure 5A:
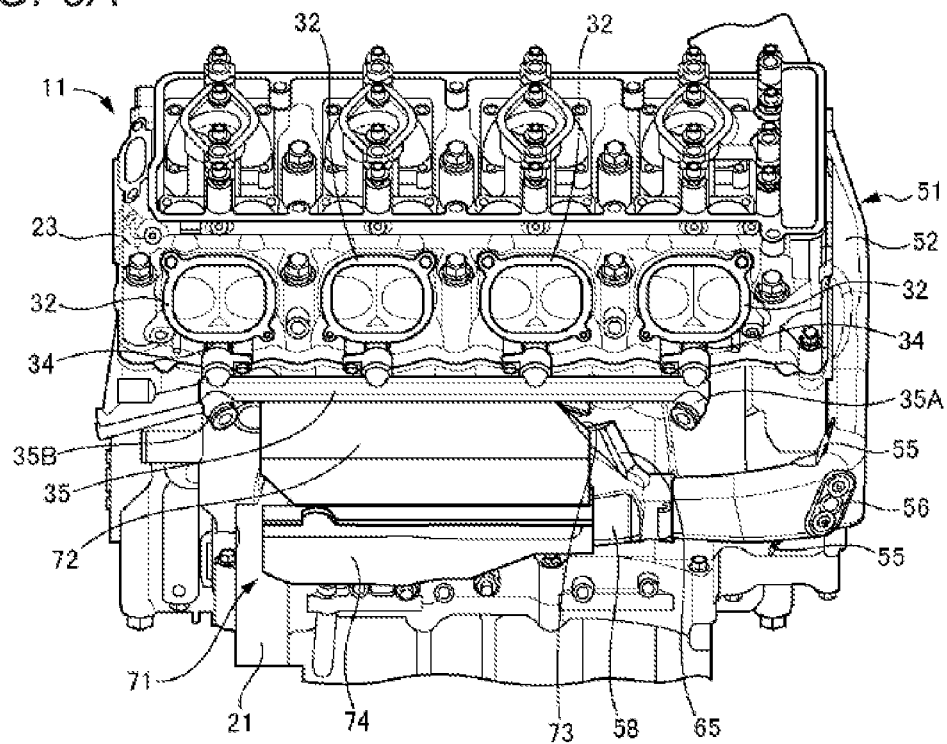
FIGS. 5A and 5B are explanatory views showing a state in which components disposed on the rear side of the engine are viewed from above in the straddle-type vehicle according to the embodiment of the present invention.
Figure 5B:
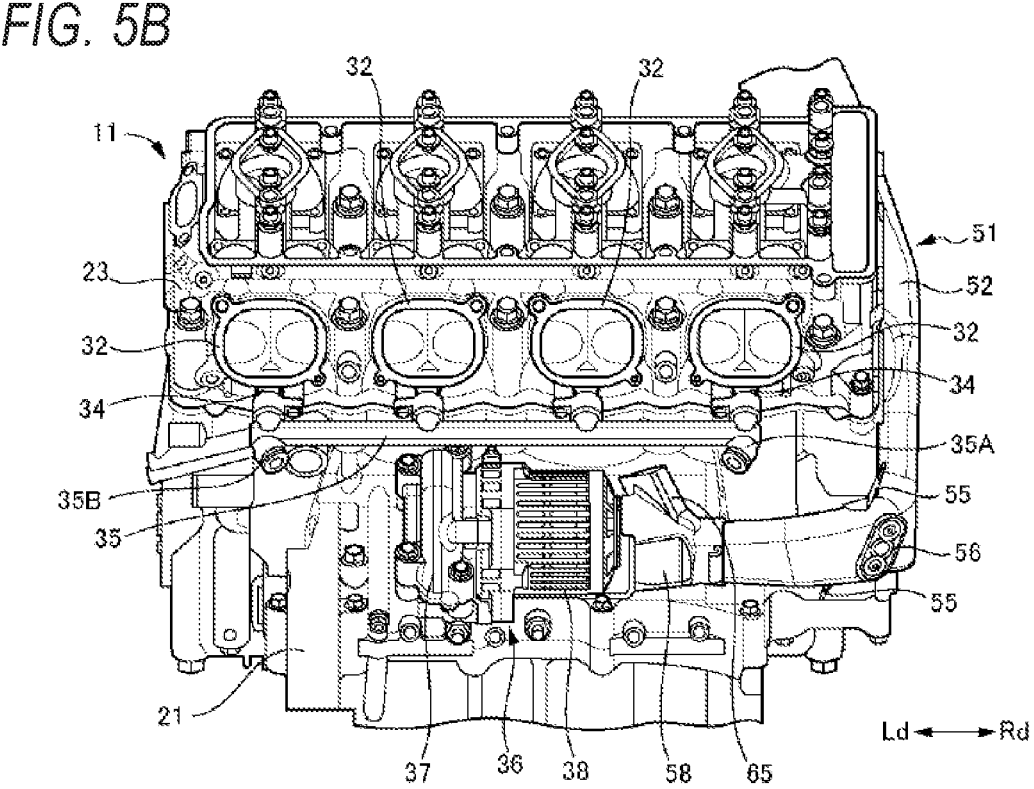

FIG. 5A shows a state in which a rear side of the engine 11 is viewed from above. In FIG. 5A, the cylinder head cover 24, the air cleaner 26, the throttle body 31 and the throttle valve drive motor 33 are removed. FIG. 5B shows a state in which the partition wall 71 is removed from FIG. 5A.

As shown in FIG. 4B, the throttle body 31 is disposed below the air cleaner 26 and above an intake port provided at a rear portion of the cylinder head 23 of the engine 11. The throttle body 31 is provided with passages through which the air for fuel combustion purified by the air cleaner 26 flows into the cylinders of the engine 11, and a throttle valve that adjusts an intake air amount of the engine 11 is provided in each passage.

The intake pipe 32 is a pipe connecting the passage of the throttle body 31 and the intake port of the engine 11. The intake pipe 32 is provided for each cylinder. Each intake pipe 32 extends linearly in an upper-lower direction, and is provided between the throttle body 31 and the intake port of the engine 11.

The throttle valve drive motor 33 is a motor that drives a throttle valve to control an opening degree of the throttle valve. The throttle valve drive motor 33 is disposed behind the throttle body 31 between the air cleaner 26 and the cylinder head 23, and is adjacent to the throttle body 31.

The injector 34 is a device that injects the fuel into the air drawn into each cylinder of the engine 11. As shown in FIG. 5A, the injector 34 is provided for each cylinder. A front end portion of each injector 34 is attached to a rear portion of the intake pipe 32.

The fuel pipe 35 is a pipe that supplies the fuel to each injector 34. As shown in FIG. 4B, the fuel pipe 35 is disposed below the throttle valve drive motor 33 and behind the four intake pipes 32, between the air cleaner 26 and the cylinder head 23. As shown in FIG. 5A, the fuel pipe 35 extends in a left-right direction, a right end portion of the fuel pipe 35 is located behind the rightmost intake pipe, and a left end portion of the fuel pipe 35 is located behind the leftmost intake pipe. A rear end portion of each injector 34 is attached to the fuel pipe 35. A fuel supply pipe that supplies the fuel from the fuel tank to the fuel pipe 35 is connected to a connection portion 35A provided at one end portion of the fuel pipe 35. A fuel return pipe that returns excess fuel to the fuel tank is connected to a connection portion 35B provided at the other end portion of the fuel pipe 35.

The generator 36 is a device that generates electric power using power of the engine 11. As shown in FIG. 4B, the generator 36 is disposed below a rear portion of the air cleaner 26, above a front portion of the engine case 21, and behind the fuel pipe 35. The generator 36 is adjacent to the fuel pipe 35 in a front-rear direction. As shown in FIG. 5B, the generator 36 is disposed substantially in a center of the engine 11 in the left-right direction, and is located behind the second and third intake pipes 32 from the right side.

The generator 36 includes a drive unit 37 and a power generation unit 38. The drive unit 37 is a portion that rotates the rotation shaft 39 of the generator 36 (see FIGS. 7 and 10) in response to rotation of the crankshaft of the engine 11. The rotation shaft 39 is connected to the crankshaft via, for example, a gear. The power generation unit 38 is a portion that generates the electric power by rotation of the rotation shaft 39. As shown in FIG. 5B, the drive unit 37 is disposed at a left portion of the generator 36, and the power generation unit 38 is disposed at a right portion of the generator 36. The rotation shaft 39 extends in the left-right direction from the drive unit 37 to the power generation unit 38 inside the generator 36. A front side, a rear side and an upper side of the generator 36 are covered with the partition wall 71. The partition wall 71 will be described later.

Figure 6:
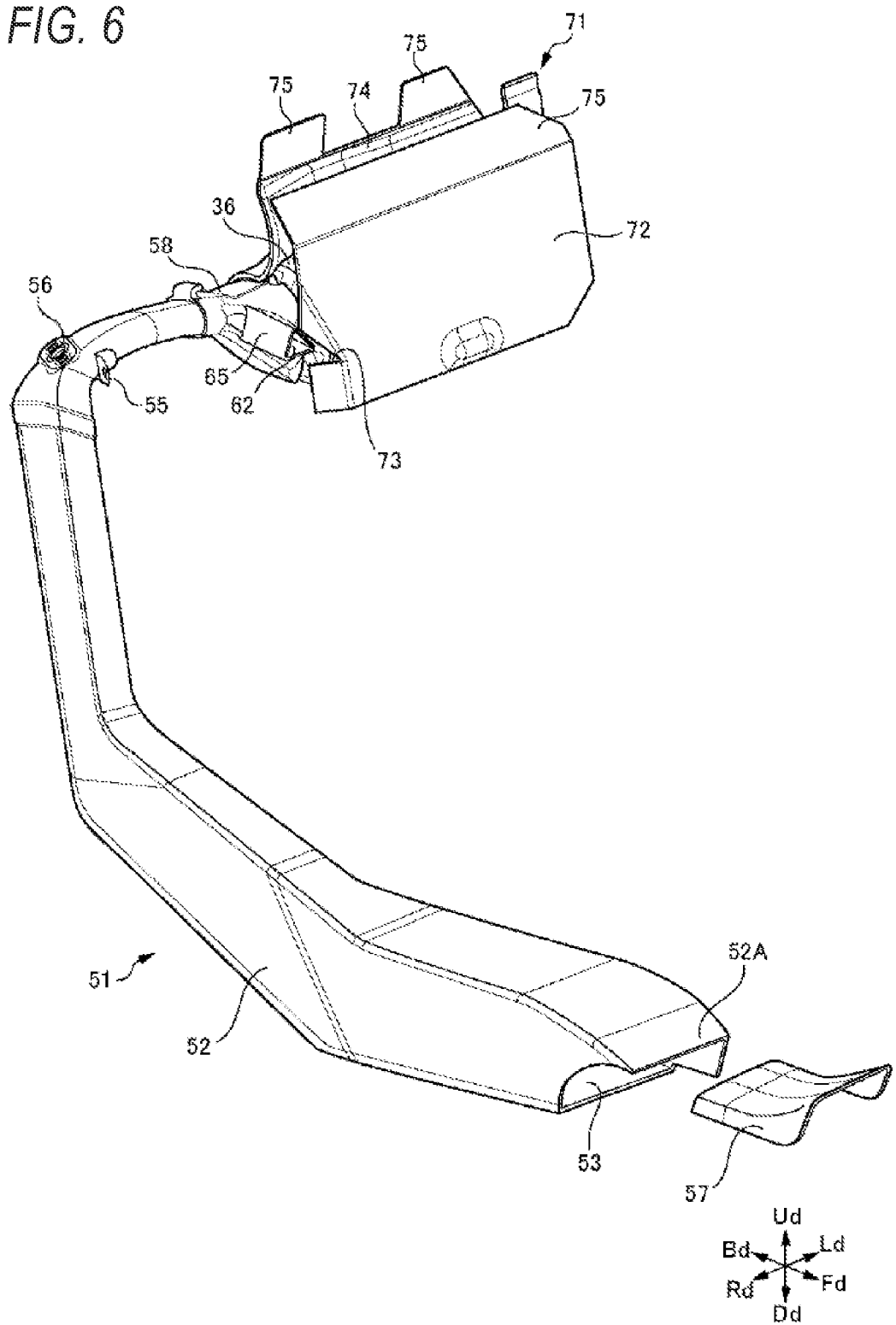
FIG. 6 is an explanatory view showing the outside air introduction duct, a partition wall and the like in the straddle-type vehicle according to the embodiment of the present invention.
Figure 7:
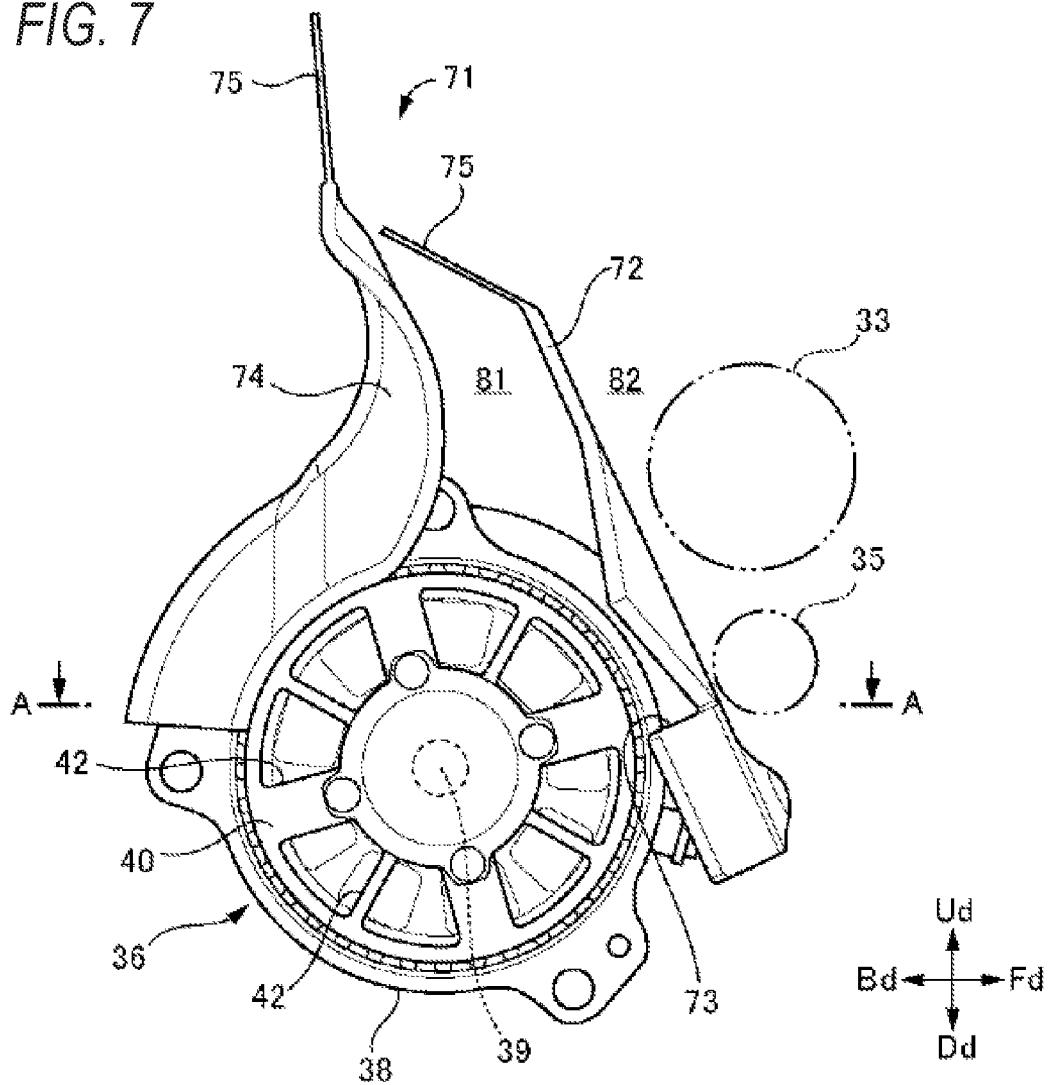
FIG. 7 is an explanatory view showing a state in which the generator and the partition wall in the straddle-type vehicle according to the embodiment of the present invention are viewed from the lateral side.
Figure 8A:
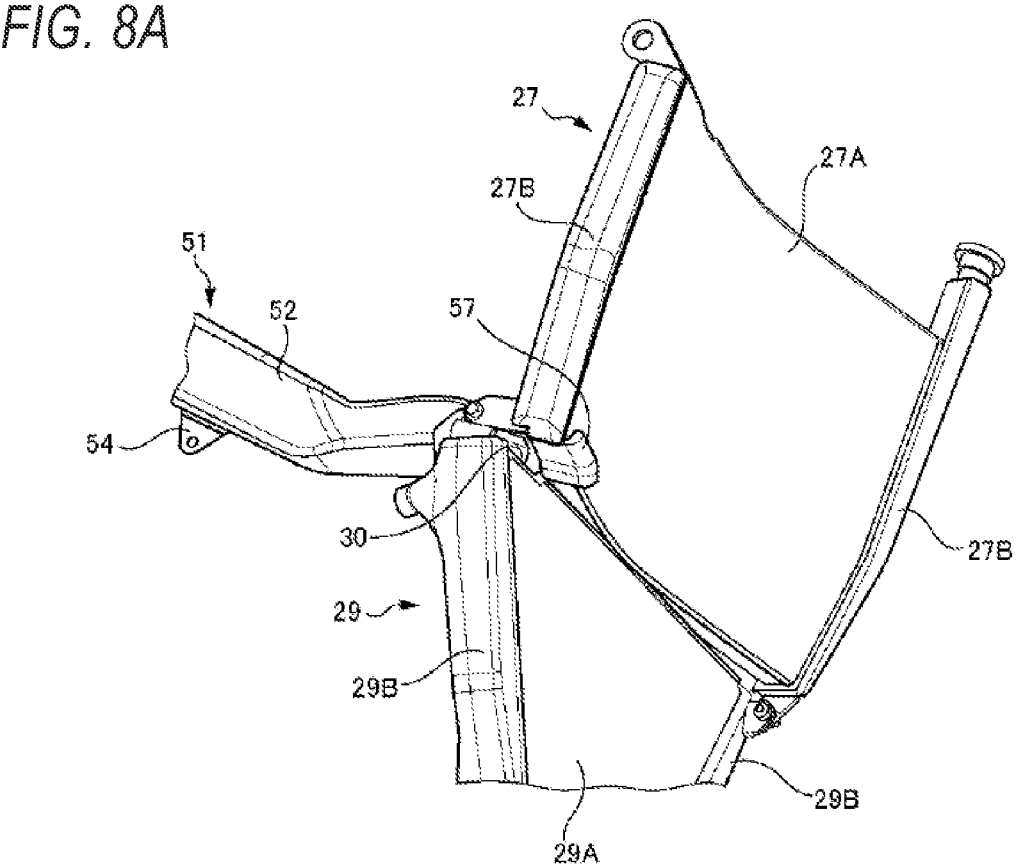
FIGS. 8A and 8B are explanatory views showing the radiator, the oil cooler and the outside air introduction duct in the straddle-type vehicle according to the embodiment of the present invention.
Figure 8B:
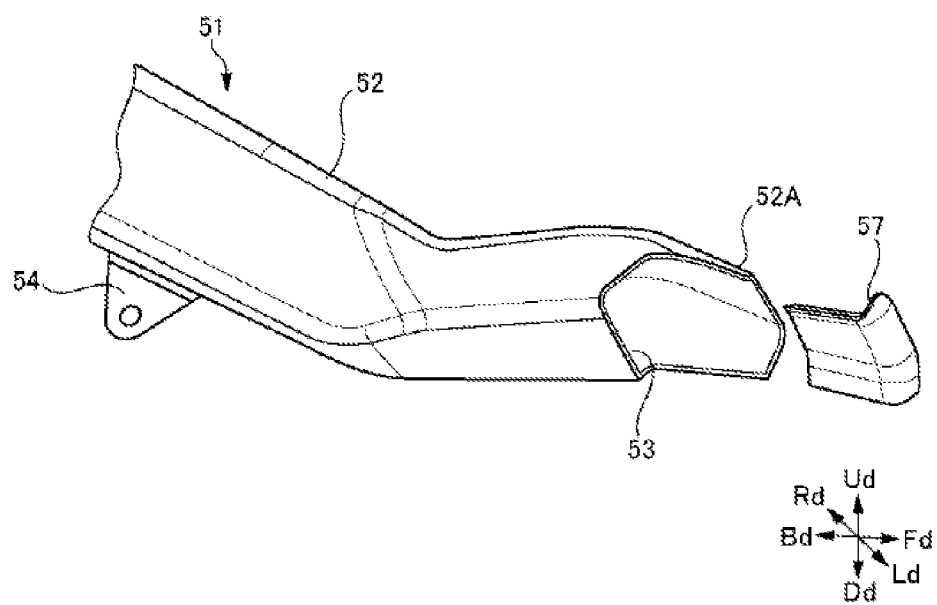
Figure 9:
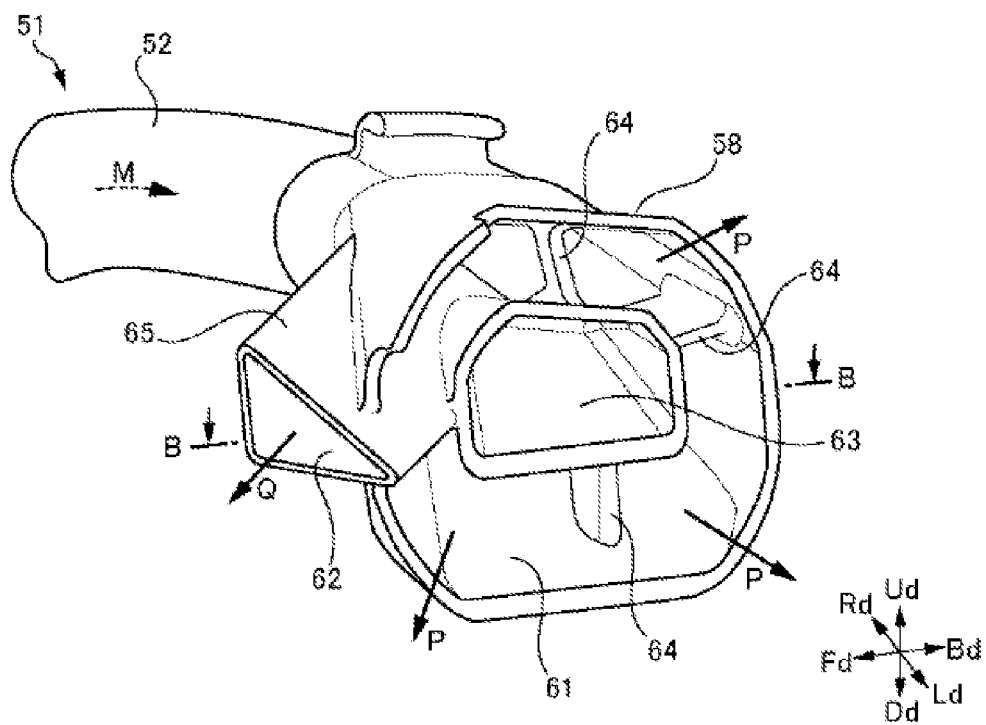
FIG. 9 is an explanatory view showing a rear end portion of the outside air introduction duct in the straddle-type vehicle according to the embodiment of the present invention.
Figure 10:
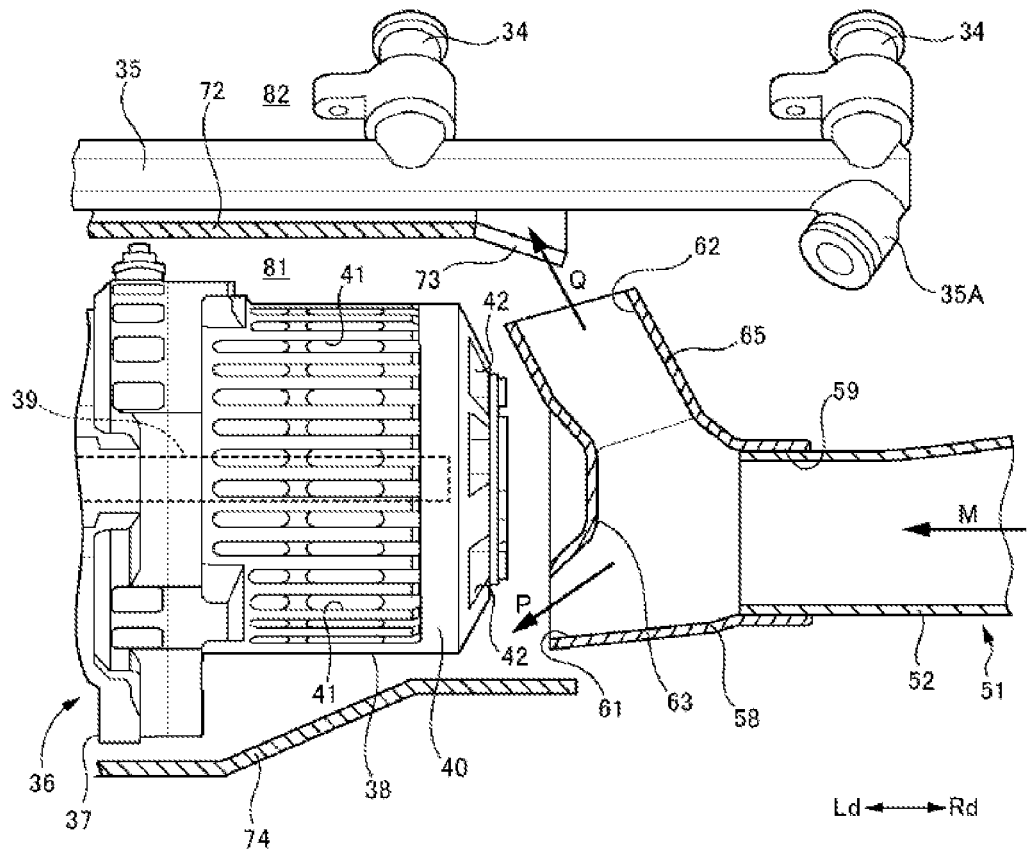
FIG. 10 is an explanatory view showing a state in which a power generation unit of the generator, the rear end portion of the outside air introduction duct with an upper portion cut off, and the partition wall with an upper portion cut off are viewed from above in the straddle-type vehicle according to the embodiment of the present invention.

FIG. 6 shows the outside air introduction duct 51, the partition wall 71, and the generator 36 covered by the partition wall 71. FIG. 7 shows the generator 36 and the partition wall 71 as viewed from the right side. In FIG. 7, positions of the throttle valve drive motor 33 and the fuel pipe 35 are indicated by two-dot chain lines. FIG. 8A shows a front end portion (an inflow side end portion) of the outside air introduction duct 51 disposed between the radiator 27 and the oil cooler 29. FIG. 8B shows only the front end portion of the outside air introduction duct 51 in an enlarged manner by removing the radiator 27 and the oil cooler 29 from FIG. 8A. FIG. 9 shows a rear end portion (an outflow side end portion) of the outside air introduction duct 51. FIG. 10 shows a state in which the power generation unit 38 of the generator 36, the rear end portion of the outside air introduction duct 51 with un upper portion cut off, and the partition wall 71 with un upper portion cut off are viewed from above. In FIG. 10, a cutting position of the rear end portion of the outside air introduction duct 51 is substantially a position indicated by a cutting line A-A in FIG. 7. In FIG. 10, a cutting position of the partition wall 71 is substantially a position indicated by a cutting line B-B in FIG. 9.

First, the partition wall 71 will be described. As shown in FIGS. 6 and 7, the partition wall 71 is a wall that covers the front side, the rear side and the upper side of the generator 36. The partition wall 71 includes a front wall piece 72 as a first wall portion that covers the front side and the upper side of the generator 36, and a rear wall piece 74 as a second wall portion that covers the rear side and the upper side of the generator 36. Each of the front wall piece 72 and the rear wall piece 74 is a plate-shaped member having a high heat insulation property, and is formed, for example, by covering a wire mesh with a heat insulating material. As the heat insulating material, for example, a resin having high heat resistance to reflect heat, such as polyimide, can be used.

The front wall piece 72 has a wide surface extending in the upper-lower direction and the left-right direction, and widely covers the power generator 36 from the front side to the upper side. The front wall piece 72 is disposed between the fuel pipe 35 and the generator 36. As shown in FIG. 7, a lower edge portion of the front wall piece 72 is located lower than the fuel pipe 35. An upper edge portion of the front wall piece 72 is located higher than the fuel pipe 35, and higher than the throttle valve drive motor 33. As can be seen from FIGS. 5A and 5B, a right edge portion of the front wall piece 72 is located on a right side of the generator 36, and a left edge portion of the front wall piece 72 is located on a left side of the generator 36. As shown in FIG. 7, a notch 73 is formed in the right edge portion of the front wall piece 72. In the upper-lower direction, a position of the notch 73 is the same as the position of the fuel pipe 35.

The region on the rear side of the engine 11 is partitioned by a front wall piece 72 into a generator arrangement region 81 and a fuel pipe arrangement region 82. That is, as shown in FIG. 7, in the region on the rear side of the engine 11, a region behind the front wall piece 72 is the generator arrangement region 81. The generator 36 is disposed in the generator arrangement region 81. On the other hand, in the region on the rear side of the engine 11, a region in front of the front wall piece 72 is the fuel pipe arrangement region 82. The fuel pipe 35 is disposed in the fuel pipe arrangement region 82. In the fuel pipe arrangement region 82, not only the fuel pipe 35 but also the throttle body 31, the intake pipes 32, the throttle valve drive motor 33 and the injectors 34 are disposed.

The rear wall piece 74 has a wide surface extending in the upper-lower direction and the left-right direction, and widely covers the generator 36 from the rear side to the upper side. As can be seen from FIGS. 5A and 5B, a right edge portion of the rear wall piece 74 is located on the right side of the generator 36, and a left edge portion of the front wall piece 72 is located on the left side of the generator 36. A dimension of the rear wall piece 74 in the left-right direction is substantially the same as a dimension of the front wall piece 72 in the left-right direction. The dimension of each of the front wall piece 72 and the rear wall piece 74 in the left-right direction is sufficiently larger than a dimension of the generator 36 in the left-right direction (an axial direction of the rotation shaft 39), but is smaller than a dimension of the engine 11 in the left-right direction.

As shown in FIG. 7, lower portions of the front wall piece 72 and the rear wall piece 74 are separated from each other, and the generator 36 is disposed between the front wall piece 72 and the rear wall piece 74. On the other hand, upper portions of the front wall piece 72 and the rear wall piece 74 are located above the generator 36 and are close to each other. In this way, the partition wall 71 covers the front side, the rear side and the upper side of the generator 36, but does not cover a right side and a left side of the generator 36. The partition wall 71 extends in the left-right direction as a whole, and is formed in a tunnel shape in which a left side and a right side thereof are opened, respectively.

A wall piece fixing portion 75 is formed on an upper edge portion of each of the front wall piece 72 and the rear wall piece 74. As shown in FIG. 4B, the front wall piece 72 and the rear wall piece 74 are fixed to the case of the air cleaner 26 by joining (for example, welding or bolting) the wall piece fixing portions 75 to an outer surface of the case of the air cleaner 26.

Next, the outside air introduction duct 51 will be described. The outside air introduction duct 51 is a duct that guides air outside the straddle-type vehicle 1, more specifically, the traveling wind to the rear side of the engine 11. As shown in FIG. 6, the outside air introduction duct 51 includes a pipeline portion 52, a funnel portion 57, and an outlet forming portion 58 as a flow control portion. Each of the pipeline portion 52, the funnel portion 57 and the outlet forming portion 58 is formed of, for example, a resin material, specifically, polypropylene or carbon fiber reinforced plastic.

The pipeline portion 52 is a tubular member that conveys the air from a front side of the engine 11 to the rear side of the engine 11. The pipeline portion 52 extends from a right front side of the engine 11 to the rear side of the engine 11 through the right side of the engine 11. Specifically, as shown in FIG. 2, the pipeline portion 52 extends in a substantially horizontal direction from the right front side to the rear side of the engine 11, then extends while bending upward on a right side of the engine case 21, then bends to the left, then enters a region between the left and right main frames 4 through an insertion hole 16 provided in an engine suspension portion 15 integrally formed with the right main frame 4, and then reaches the region on the rear side of the engine 11 as shown in FIG. 5A.

As shown in FIG. 2, a pipeline fixing portion 54 is provided at a front portion of the pipeline portion 52, and the front portion of the pipeline portion 52 is supported by the engine 11 by fixing the pipeline fixing portion 54 to a front portion of a right wall of the engine case 21 using a bolt or the like. A pipeline fixing portion 55 is provided at a rear portion of the pipeline portion 52, and the rear portion of the pipeline portion 52 is supported by the right main frame 4 by fixing the pipeline fixing portion 55 to a right surface of the right main frame 4 using a bolt or the like. A cowl attachment portion 56 for attaching a right portion of the cowl 14 is provided at a portion of the rear portion of the pipeline portion 52 that is curved to the left. The right portion of the cowl 14 can be supported by the straddle-type vehicle 1 by, for example, bolt-fixing the right portion of the cowl 14 to the cowl attachment portion 56.

As shown in FIG. 8A, the front end portion of the outside air introduction duct 51 is disposed between a right portion of the radiator 27 and a right portion of the oil cooler 29. Specifically, as shown in FIG. 3B, a recess 28 is formed in a lower right portion of the core 27A of the radiator 27. A recess 30 is formed in an upper right portion of the core 29A of the oil cooler 29. In a front view of the straddle-type vehicle 1, the recess 28 of the radiator 27 and the recess 30 of the oil cooler 29 face each other in the upper-lower direction. As shown in FIG. 8B, an inlet 53 that opens forward is provided at a front end portion of the pipeline portion 52. As can be seen from FIGS. 3B and 8A, the inlet 53 is disposed at a position immediately behind the radiator 27 and the oil cooler 29 and corresponding to the two recesses 28, 30 facing each other. Accordingly, the air that has flowed in between the recesses 28, 30 from a front side of the radiator 27 and the oil cooler 29 flows into the inlet 53 of the pipeline portion 52.

The funnel portion 57 is a member that allows the air to smoothly flow into the outside air introduction duct 51. As can be seen from FIGS. 8A and 8B, the funnel portion 57 is provided at the front end portion of the outside air introduction duct 51, and specifically, in front of the inlet 53 of the pipeline portion 52. The funnel portion 57 is formed in a half-funnel shape expanding forward. The funnel portion 57 gradually increasing a flow path area of the air in the outside air introduction duct 51 toward a distal end of the outside air introduction duct 51 on a front end side, thereby allowing the air to smoothly flow into the outside air introduction duct 51. The funnel portion 57 is provided in the recess 28 formed in the core 27A of the radiator 27, and is fixed in the recess 28 using, for example, a rivet or an adhesive. As shown in FIG. 8A, a front end portion of the funnel portion 57 slightly protrudes forward from inside of the recess 28, and the protruding portion covers a front lower edge portion of a right portion of the core 27A of the radiator 27 (a front edge portion of the recess 28).

As shown in FIG. 8A, the core 27A of the radiator 27 is formed in a curved plate shape such that a central portion of the core 27A in the left-right direction is located behind a left end portion and a right end portion of the core 27A as a whole. On the other hand, the core 29A of the oil cooler 29 is formed in a flat plate shape that is not curved as a whole. The core 27A of the radiator 27 and the core 29A of the oil cooler 29 are disposed such that positions of central portions of both in the left-right direction are aligned in the front-rear direction. As a result, the left end portion and the right end portion of the core 27A of the radiator 27 are located in front of a left end portion and a right end portion of the core 29A of the oil cooler 29, and the left and right tanks 27B of the radiator 27 are located in front of the left and right tanks 29B of the oil cooler 29. As a result, the recess 28 of the radiator 27 is located to be shifted forward of the recess 30 of the oil cooler 29. As can be seen from FIGS. 8A and 8B, a protruding portion 52A protruding forward is formed in an upper portion of the front end portion of the pipeline portion 52, and the protruding portion 52A covers an upper side of the recess 30 of the oil cooler 29 immediately behind the recess 28 of the radiator 27. A distal end of the protruding portion 52A is extremely close to or in contact with a rear end of the funnel portion 57 provided in the recess 28 of the oil cooler 29. In this way, the funnel portion 57, the recess 30 of the oil cooler 29, and the protruding portion 52A of the pipeline portion 52 form a substantially funnel shaped air path at the front end portion of the outside air introduction duct 51.

The outlet forming portion 58 is a member that controls an outflow destination and an outflow direction of the air flowing out from the pipeline portion 52. As shown in FIG. 6, the outlet forming portion 58 is provided at the rear end portion of the outside air introduction duct 51. Specifically, the outlet forming portion 58 is provided at an end portion of the rear portion of the pipeline portion 52 that bends to the left, that is, at a left end portion of the pipeline portion 52.

As shown in FIG. 9, the outlet forming portion 58 is formed in a tubular shape whose diameter increases toward the left side. As shown in FIG. 10, an opening 59 on a right end side (an inflow side) of the outlet forming portion 58 is connected to the left end portion of the pipeline portion 52, and inside of the pipeline portion 52 and inside of the outlet forming portion 58 communicate with each other. As indicated by an arrow M in FIG. 10, the air conveyed by the pipeline portion 52 flows into the outlet forming portion 58 through the opening 59.

The outlet forming portion 58 includes a first outlet 61 that allows the air that has flowed into the outlet forming portion 58 to flow out to the generator arrangement region 81, and a second outlet 62 that allows the air that has flowed into the outlet forming portion 58 to flow out to the fuel pipe arrangement region 82. The first outlet 61 is formed at a left end portion (an outflow side end portion) of the outlet forming portion 58. The first outlet 61 opens leftward and faces the generator arrangement region 81. The left end portion of the outlet forming portion 58 is inserted into the partition wall 71 (between the front wall piece 72 and the rear wall piece 74) from a right side of the partition wall 71, and the first outlet 61 is located in the partition wall 71.

The left end portion of the outlet forming portion 58 faces the power generation unit 38 of the generator 36 and is extremely close to the power generation unit 38. Specifically, the generator 36 is disposed in a region behind the engine 11 such that the drive unit 37 is on a left side, the power generation unit 38 is on a right side, and the rotation shaft 39 extends in the left-right direction. As shown in FIG. 10, the power generation unit 38 of the generator 36 includes a housing 40 that accommodates internal components (a right portion of the rotation shaft 39, an electromagnet or the like) of the power generation unit 38. The housing 40 is formed in a covered cylindrical shape having a circumferential wall that surrounds an upper side, a lower side, a front side and a rear side of the internal components of the power generation unit 38, and a right wall that covers a right side of the internal components of the power generation unit 38. A plurality of slits 41 penetrating the circumferential wall are formed in the circumferential wall of the housing 40, and a plurality of holes 42 penetrating the right wall are formed in an outer circumferential portion of the right wall of the housing 40. The slits 41 and the holes 42 allow heat inside the power generation unit 38 to be released to the outside. The left end portion of the outlet forming portion 58 faces the right wall of the housing 40 of the power generation unit 38 and is extremely close to the right wall. The first outlet 61 opens toward the right wall.

As shown in FIG. 9, a central closing portion 63 is provided at a central portion in the first outlet 61. The central closing portion 63 is supported by a peripheral wall portion of the outlet forming portion 58 via a plurality of support portions 64. The central closing portion 63 has a function of blocking a flow of the air at the central portion in the first outlet 61 and guiding the air to an outer peripheral portion in the first outlet 61. As indicated by arrows P in FIG. 9, the air conveyed by the pipeline portion 52 and flowed into the outlet forming portion 58 flows out of the outer peripheral portion in the first outlet 61 to outside of the outlet forming portion 58. In the present embodiment, a diameter of the first outlet 61 is substantially equal to an outer diameter of the housing 40 of the power generation unit 38. As can be seen from FIGS. 4A and 4B, the first outlet 61 is disposed substantially coaxially with the housing 40. Therefore, the air that has flowed out of the outer peripheral portion in the first outlet 61 flows toward the outer circumferential portion of the right wall of the housing 40 of the power generation unit 38 and an outer circumferential side of the circumferential wall of the housing 40.

The outlet forming portion 58 is provided with a branch pipe portion 65 that supplies a part of the air conveyed by the pipeline portion 52 and flowed into the outlet forming portion 58 to the fuel pipe arrangement region 82. The branch pipe portion 65 is formed in a front portion of the peripheral wall portion of the outlet forming portion 58. The branch pipe portion 65 extends from a central portion of the outlet forming portion 58 to a left front side. The branch pipe portion 65 in the present embodiment is formed in a tubular shape having a triangular cross section. As shown in FIG. 10, an end portion of the branch pipe portion 65 on a right rear side communicates with the inside of the outlet forming portion 58.

The second outlet 62 is formed at the end portion of the branch pipe portion 65 on a left front side. The second outlet 62 opens toward a left front side, and faces the fuel pipe arrangement region 82 via a notch 73 formed in the front wall piece 72. That is, the end portion of the branch pipe portion 65 on the left front side faces the notch 73 and is extremely close to the notch 73. A position of the second outlet 62 corresponds to the position of the notch 73. A shape of the second outlet 62 is triangular, and this shape is substantially the same as a shape of the notch 73. The air that has flowed out of the second outlet 62 flows into the fuel pipe arrangement region 82 through inside of the notch 73 as indicated by an arrow Q in FIG. 10.

A flow of the air in the outside air introduction duct 51 and the partition wall 71 will be collectively described. When the straddle-type vehicle 1 is traveling, a part of the air (the traveling wind) outside the straddle-type vehicle 1 flows to the front side of the radiator 27 and the oil cooler 29, and blows against front surfaces of the radiator 27 and the oil cooler 29. A part of the air that has flowed to the front side of the radiator 27 and the oil cooler 29 is controlled by the funnel portion 57 in a flow direction thereof, is collected in the inlet 53 of the pipeline 52, and flows into the inlet 53 of the pipeline portion 52.

The air that has flowed into the pipeline portion 52 flows through the pipeline portion 52, and thereby moves to the rear side of the engine 11 and flows into the outlet forming portion 58. A part of the air that has flowed into the outlet forming portion 58 flows into the branch pipe portion 65 toward the second outlet 62, and a remaining part of the air that has flowed into the outlet forming portion 58 flows toward the first outlet 61. In the present embodiment, a flow path area of the branch pipe portion 65 (an area of the second outlet 62) is smaller than a flow path area of a main body of the outlet forming portion 58 (an area of the first outlet 61). Therefore, an amount of the air flowing toward the first outlet 61 is larger than an amount of the air flowing toward the second outlet 62.

The air flowing toward the first outlet 61 is guided to the outer peripheral portion in the first outlet 61 by the central closing portion 63. As indicated by the arrow P in FIG. 10, the air guided to the outer peripheral portion in the first outlet 61 flows out of the first outlet 61 to a region inside the partition wall 71 located in the generator arrangement region 81 (a region between the front wall piece 72 and the rear wall piece 74). A part of the air that has flowed out to the region inside the partition wall 71 enters the housing 40 through the holes 42 formed in the outer circumferential portion of the right wall of the housing 40 of the power generation unit 38 of the generator 36, and pushes air in the housing 40 out of the housing 40 via the slits 41. Other part of the air that has flowed out to the region inside the partition wall 71 flows between the circumferential wall of the housing 40 and the front wall piece 72 or between the circumferential wall of the housing 40 and the rear wall piece 74, and pushes the air on an outer circumferential side of the housing 40 leftward. The air that flowed out of the first outlet 61 to the region inside the partition wall 71 moves leftward inside the partition wall 71 in this way, then flows out of the partition wall 71 from a left end portion of the partition wall 71, and then flows to a left rear side of the engine 11. In this way, the generator 36 is cooled by the air flowing inside the partition wall 71.

On the other hand, the air that has flowed into the branch pipe portion 65 flows out of the second outlet 62, flows into the fuel pipe arrangement region 82 through the inside of the notch 73, and blows against the fuel pipe 35. Accordingly, the fuel pipe 35 is cooled.

As described above, according to the straddle-type vehicle 1 according to the embodiment of the present invention, an amount of heat transmitted from the generator 36 to the fuel pipe 35 can be reduced by a heat insulation action of the front wall piece 72 provided between the fuel pipe 35 and the generator 36. Accordingly, a temperature rise of the fuel flowing through the fuel pipe 35 can be prevented.

The air introduced by the outside air introduction duct 51 is allowed to flow out of the first outlet 61 to the generator arrangement region 81, so that the traveling wind can intensively blow against the generator 36. Accordingly, an effect of cooling the generator 36 can be enhanced, and the amount of the heat transmitted from the generator 36 to the fuel pipe 35 can be further reduced.

The region on the rear side of the engine 11 is partitioned by the front wall piece 72 into the generator arrangement region 81 and the fuel pipe arrangement region 82, the air introduced by the outside air introduction duct 51 flows into the generator arrangement region 81, and the air that has flowed in is discharged to a place away from the fuel pipe arrangement region 82. Specifically, the air introduced by the outside air introduction duct 51 flows into the partition wall 71 from a right side of the partition wall 71, and is discharged to the left rear side of the engine 11 from a left side of the partition wall 71. Accordingly, the air after flowing through the generator arrangement region 81 can be prevented from entering the fuel pipe arrangement region 82. Therefore, exhaust air with the heat generated by the generator 36 can be prevented from blowing against the fuel pipe 35, and an effect of preventing the temperature rise of the fuel flowing through the fuel pipe 35 can be enhanced. As shown in FIG. 5A, by making the dimension of the front wall piece 72 in the left-right direction larger than the dimension of the generator 36 in the left-right direction (the axial direction of the rotation shaft 39), an effect of preventing the air after flowing through the generator arrangement region 81 from entering the fuel pipe arrangement region 82 can be enhanced.

In the straddle-type vehicle 1 according to the embodiment of the present invention, the partition wall 71 includes the front wall piece 72 that covers the front side of the generator 36 and the rear wall piece 74 that covers the rear side of the generator 36, and the first outlet 61 of the outside air introduction duct 51 enters between the front wall piece 72 and the rear wall piece 74. Accordingly, the air that has flowed out of the first outlet 61 can be concentrated on the generator 36, and an amount of the air blowing against the generator 36 can be increased. Therefore, the effect of cooling the generator 36 can be further enhanced. Since the front and rear sides of the generator 36 are covered by the front wall piece 72 and the rear wall piece 74, a flow velocity of the air flowing from the right side to the left side around the generator 36 can be increased, and the effect of cooling the generator 36 can be further enhanced. In the present embodiment, the upper side of the generator 36 is also covered by the front wall piece 72 and the rear wall piece 74. Accordingly, an effect of concentrating the air on the generator 36 and an effect of increasing the flow velocity of the air flowing around the generator 36 can be enhanced.

In the straddle-type vehicle 1 according to the embodiment of the present invention, the outlet forming portion 58 is provided at the rear end portion of the outside air introduction duct 51, and the outlet forming portion 58 is provided with the central closing portion 63 that blocks the flow of the air at the central portion in the first outlet 61 and guides the air to the outer peripheral portion in the first outlet 61. Accordingly, the air that has flowed out of the first outlet 61 can smoothly flow to an outer peripheral side of the generator 36, and an amount of the air flowing on the outer peripheral side of the generator 36 can be increased. Therefore, the effect of cooling the generator 36 can be enhanced. When the central closing portion 63 is not provided, the air that has flowed out of the central portion of the first outlet 61 may blow against a center of the right wall of the housing 40 of the generator 36 and be diffused, and the air that has flowed out of the first outlet 61 may not flow in the outer peripheral side of the generator 36. Such a problem can be solved by providing the central closing portion 63.

In the straddle-type vehicle 1 according to the embodiment of the present invention, the outside air introduction duct 51 includes the second outlet 62 that allows the air to flow out to the fuel pipe arrangement region 82. The air introduced by the outside air introduction duct 51 flows into both the generator arrangement region 81 and the fuel pipe arrangement region 82 partitioned by the front wall piece 72 separately from the two outlets 61, 62 respectively corresponding to these two regions, so that the air flowing in the region on the rear side of the engine 11 can be rectified. Accordingly, the air can be prevented from diffusing in various directions in the region on the rear side of the engine 11, and the air introduced by the outside air introduction duct 51 can reliably blow against each of the generator 36 and the fuel pipe 35. Therefore, an effect of cooling each of the generator 36 and the fuel pipe 35 can be enhanced.

In the present embodiment, the air introduced by the outside air introduction duct 51 is supplied to the generator arrangement region 81 more than the fuel pipe arrangement region 82. A major factor of a temperature rise in the region on the rear side of the engine 11 during traveling is the heat generated by the generator 36. Therefore, a large amount of the air is supplied to the generator arrangement region 81, and the generator 36, which is a heat source that causes the temperature rise in the region on the rear side of the engine 11, is cooled, so that an effect of preventing the temperature rise in the region on the rear side of the engine 11 can be enhanced, and the temperature rise of the fuel flowing through the fuel pipe 35 can be effectively prevented.

In the straddle-type vehicle 1 according to the embodiment of the present invention, the front end portion of the outside air introduction duct 51 is disposed between the radiator 27 and the oil cooler 29. Accordingly, the traveling wind blowing from a front side of the straddle-type vehicle 1 during traveling can be allowed to flow into the outside air introduction duct 51, and an amount of the air introduced by the outside air introduction duct 51 can be increased. In addition, the traveling wind can be guided to the region on the rear side of the engine while deterioration of aerodynamic performance of the straddle-type vehicle can be prevented.

The funnel portion 57 is provided at the front end portion of the outside air introduction duct 51. Even when the inflow side end portion of the outside air introduction duct 51 is disposed in a small gap between the radiator 27 and the oil cooler 29, the amount of the air introduced by the outside air introduction duct 51 can be increased by the funnel portion 57. That is, when the inflow side end portion of the outside air introduction duct 51 is disposed in the small gap between the radiator 27 and the oil cooler 29, and the funnel portion 57 is not provided, the traveling wind that has flowed to the front side of the radiator 27 and the oil cooler 29 blows against a lower edge portion of a front surface of the radiator 27 or an upper edge portion of a front surface of the oil cooler 29 and is diffused, and the traveling wind is less likely to flow into the outside air introduction duct 51. In contrast, even if the inflow side end portion of the outside air introduction duct 51 is disposed in the small gap between the radiator 27 and the oil cooler 29, when the funnel portion 57 is provided, a direction of the traveling wind that has flowed to the front side of the radiator 27 and the oil cooler 29 can be controlled by the funnel portion 57 such that the traveling wind flows into the outside air introduction duct 51. Therefore, the amount of the air introduced by the outside air introduction duct 51 can be increased.

In the straddle-type vehicle 1 according to the present embodiment, as shown in FIG. 8A, the core 29A of the oil cooler 29 has the flat plate shape that is not curved, while the core 27A of the radiator 27 is curved, so that positions of the right portion of the radiator 27 and the right portion of the oil cooler 29 in the front-rear direction are shifted from each other, and the inflow side end portion of the outside air introduction duct 51 is disposed between the right portion of the radiator 27 and the right portion of the oil cooler 29 that are shifted from each other in this way. Even in such a case, by providing the funnel portion 57 and controlling the direction of the traveling wind that has flowed to the front side of the radiator 27 and the oil cooler 29, the air can smoothly flow into the outside air introduction duct 51.

The funnel portion 57 is formed in the half-funnel shape, and covers the front lower edge portion of the right portion of the core 27A of the radiator 27 (the front edge portion of the recess 28). If a complete funnel-shaped funnel portion that does not lack a part of a peripheral wall is provided in the small gap between the radiator 27 and the oil cooler 29, an inner diameter of the funnel portion is reduced, and therefore, a flow path area at the inflow side end portion of the outside air introduction duct 51 is reduced. As a result, the amount of the air flowing into the outside air introduction duct 51 may be rather reduced. In contrast, the funnel portion 57 is formed into the half-funnel shape, and the funnel portion 57 is provided at the front lower edge portion of the radiator 27, and is not provided at an front upper edge portion of the oil cooler 29, so that the flow path area at the inflow side end portion of the outside air introduction duct 51 can be increased while an effect of the funnel portion 57 that controls the direction of the traveling wind and increases the amount of the air flowing into the outside air introduction duct 51 can be obtained. Therefore, the amount of the air introduced by the outside air introduction duct 51 can be increased.

Arrangement of the outside air introduction duct 51, the partition wall 71, the generator 36 and the like in the straddle-type vehicle 1 may be reversed in the left-right direction. The upper side of the generator 36 may not be covered by the partition wall 71. In the partition wall 71, the rear wall piece 74 may be removed. In the partition wall 71, the front wall piece 72 and the rear wall piece 74 may be integrated.

In the above embodiment, the funnel portion 57 is provided at a lower portion of the upper heat exchanger (the radiator 27) and covers the front lower edge portion of the upper heat exchanger, but the funnel portion 57 may be provided at an upper portion of the lower heat exchanger (the oil cooler 29) to cover the front upper edge portion of the lower heat exchanger. Arrangement of the radiator 27 and the oil cooler 29 may be reversed in the upper-lower direction.

A position of the inflow side end portion of the outside air introduction duct 51 is not limited to a position between the upper heat exchanger (the radiator 27) and the lower heat exchanger (the oil cooler 29). For example, the position of the inflow side end portion of the outside air introduction duct 51 may be above or on a lateral side of the upper heat exchanger, or may be below or on a lateral side of the lower heat exchanger. A hole may be formed at any position of the cowl 14, and an inflow side end portion of the outside air introduction duct 51 may be connected to the hole.

The present invention is not limited to the motorcycle, and may be applied to various straddle-type vehicles such as a three-wheeled vehicle, a scooter, a buggy vehicle and the like.

The present invention can be appropriately modified without departing from the gist or idea of the invention that can be read from the claims and the entire specification, and a straddle-type vehicle accompanied by such a modification is also included in the technical idea of the present invention.

According to the present invention, a rise in a fuel temperature can be prevented in a case where the fuel pipe and the generator are provided on the rear side of the engine.

What is claimed is:
1. A straddle-ride vehicle comprising:
a vehicle body frame;
a front wheel supported by a front portion of the vehicle body frame via a front fork;
a rear wheel supported by a rear portion of the vehicle body frame via a swing arm;
an engine located between the front wheel and the rear wheel and supported by the vehicle body frame;
a fuel pipe provided on a rear side of the engine and configured to supply fuel to the engine;
a generator provided on the rear side of the engine, adjacent to the fuel pipe, and configured to generate electric power using power of the engine;
an outside air introduction duct configured to guide air outside the straddle-ride vehicle to the rear side of the engine; and
a partition wall, provided between the fuel pipe and the generator, and partitioning a region on the rear side of the engine into a generator arrangement region where the generator is provided and a fuel pipe arrangement region where the fuel pipe is provided, wherein the outside air introduction duct includes a first outlet configured to allow the air to flow out to the generator arrangement region.

2. The straddle-ride vehicle according to claim 1, wherein the partition wall includes a first wall portion covering a front side of the generator and a second wall portion covering a rear side of the generator, and the first outlet is inserted between the first wall portion and the second wall portion.

3. The straddle-ride vehicle according to claim 1, wherein an outflow side end portion of the outside air introduction duct is provided with a flow control portion configured to block a flow of the air at a central portion in the first outlet and guide the air to an outer peripheral portion of the first outlet.

4. The straddle-ride vehicle according to claim 1, wherein the outside air introduction duct includes a second outlet configured to allow the air to flow out to the fuel pipe arrangement region.

5. The straddle-ride vehicle according to claim 1, further comprising:

an upper heat exchanger and a lower heat exchanger provided in front of the engine, the upper heat exchanger and the lower heat exchanger being arranged in an upper-lower direction, wherein an inflow side end portion of the outside air introduction duct is disposed between the upper heat exchanger and the lower heat exchanger, and the outside air introduction duct is provided with a funnel portion configured to gradually increase a flow path area of the air in the outside air introduction duct toward a distal end of the outside air introduction duct on an inflow side.

6. The straddle-ride vehicle according to claim 5, wherein the funnel portion has a half-funnel shape and covers a front lower edge portion of the upper heat exchanger or a front upper edge portion of the lower heat exchanger.

* * * * *